Patented Sept. 27, 1938

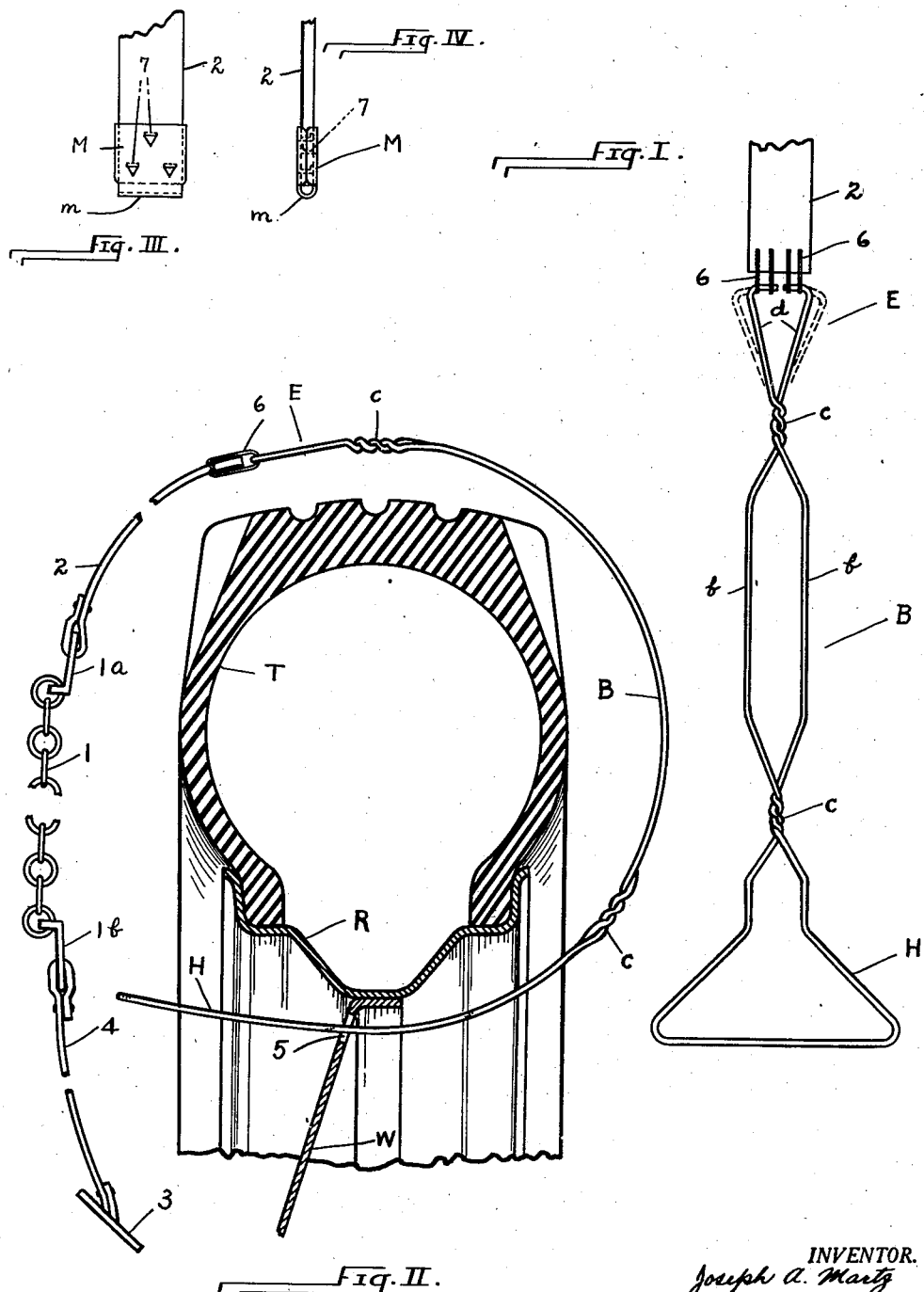

2,131,405

UNITED STATES PATENT OFFICE 2,131,405

TIRE CHAIN APPLIER

Joseph A. Martz, New Kensington, Pa., assignor of one-half to Howard J. Stewart, New Kensington, Pa.

Application November 27, 1937, Serial No. 176,798

2 Claims. (Cl. 81—15.8)

My invention relates to anti-skid chains for automobiles, particularly to the chains known on the market as emergency chains or cross-chains. More particularly the invention consists in a device for use in applying such chains to the tires of automobiles.

In the accompanying drawing, Fig. I is a view in front elevation of a chain-applying device embodying the invention, and shows fragmentarily the strap of a cross-chain, equipped with means for cooperation with the chain-applying device; Fig. II is a fragmentary view, showing an automobile tire and wheel in cross-section, and illustrating in side elevation the device of the invention in position of service; Fig. III is a fragmentary plan view of the strap of the cross-chain, equipped with modified means for cooperation with the chain-applying device; and Fig. IV is a view in side elevation of the structure shown in Fig. III.

The usual automobile emergency chain or cross-chain consists in one or more lengths of chain, steel wire, rubber, or the like, adapted to be secured upon and to extend transversely of the tread of an automobile tire. The means for securing the length of chain upon the tire consist in a strap and a buckle, or other strap-securing device. The strap is ordinarily a flat fabric strap (although straps of other material and shape may be used), which at one end is riveted or otherwise secured to one end of the chain, while the buckle, or other strap-securing device, is secured to the opposite end of the chain. In installing the cross-chain, the strap is first passed inward over the tread and downward over the side wall of the tire, and then it is drawn through an opening in (or between the spokes of) the automobile wheel, and the otherwise free end of the strap is secured in the buckle, with the chain positioned across the tread of the tire. As above mentioned, the invention consists in a device for applying such cross-chains, and, save as hereinafter mentioned, the specific structure of the cross-chains may be widely varied.

In exemplary way, I show the cross-chain as comprising a length of chain 1, the chain being indicated fragmentarily, secured at its opposite ends to plate members 1a and 1b; a strap 2 is riveted to plate 1a; and a buckle 3 is secured to plate 1b—in this case by means of a strap 4, although it will be understood that a strap-securing clamp, or the like, may be immediately secured to such plate 1b.

In general, my chain-applying device consists in a relatively narrow, flat, flexible body B of crescent shape, as viewed in side elevation (Fig. II). In this case the crescent-shaped body is formed on continuous curvature (but it may be formed by a series of angularly extending rectilinear body sections) extending through approximately 180 degrees. At one end of the crescent the flexible and resilient body B is equipped with means E for engaging the outer end of the strap 2 of the cross-chain structure, and at the opposite end is provided with a handle H. In service, the user, facing the outer or exposed side of the wheel, inserts the strap-engaging end of the device through an opening 5 in the wheel W, the inherent flexibility of the body B permitting the crescent to be readily expanded or opened sufficiently to admit of the operation. Next, the body B is progressively fed through the opening 5, and the strap-engaging end E moves, first upward on the inner side of the tire T and then outward over the tread of the tire, the resilient or spring-like body B returning to its normal curvature as the operation progresses. When fully inserted, the device is positioned as shown in Fig. II, with the strap-engaging end E readily accessible for the attachment thereto of the strap 2 of the cross-chain. Such attachment is effected. Then, with the handle H in the user's grasp, the body B is withdrawn through opening 5, the outwardly moving curved body B yielding under the applied pull into a relatively flat shape, and the inner end (E) of the device moving inward and downward over the surface of the tire. And in such way the cross-chain structure is drawn across the tread of the tire, and the end of the strap 2 is led through said opening 5. Such is the essential function of the device, for, when the cross-chain structure has been brought to such position, the device E is disengaged from the strap 2, and the strap is secured in usual way in the buckle 3, or other strap-securing device, thus completing the installation.

While my chain-applying device may be made in many various forms, it is essentially constructed of spring steel or other spring material. The desiderata gained are economy, minimized weight, and great durability with maximum resiliency.

In this case the body B is formed of a single length of spring wire, looped to form the handle H, and extending in reaches b, b that are parallel as viewed in Fig. I and crescent-shaped as viewed in Fig. II. At two or more regions c in the extent of the body, the reaches b, b of wire are crossed and twisted, as at c, c, providing greater strength, without loss of the other desirable characteristics. It will be perceived of the body that it is of greater breadth than thickness; that it is of greater flexibility in the plane of the crescent than on lines transverse thereto; and its resiliency is, as has been explained, such that after being drawn in service substantially to straight-line form, it will, when tension is relieved, resume its normal crescent shape.

The means (E) for securing the device to the end of strap 2 may take various forms, but as illustrated I preferably form such means of wire, advantageously (but not necessarily) of the wire of which the body B is itself constructed. Specifically, the two limbs of wire, extending from the upper twist c in Fig. I, are bent inward at their distal ends, in such manner as to provide a pair of tongs d which (being of formed spring material) may bodily grip the end of the strap 2 as a pair of ice-tongs grips a cake of ice, and so provide the desired attachment of the device to the cross-chain structure. Preferably, however, I provide means on the end of the strap for cooperation with the strap-engaging means of the chain-applying device. That is to say, the end of the strap 2 is equipped with a row of wire clips or loops 6 of the sort widely used in belt lacing. These clips advantageously reinforce the end of the strap against fraying, and afford very effective means for the attachment of the strap to the strap-applying device. When the chain-applying device has been brought to the position illustrated in Fig. II, the tongs d, manifestly, may be readily engaged in the loops.

In Figs. III and IV, I show a modification in the means that are provided on the end of the strap 2. Sheet metal is fashioned into the form of a ferrule M illustrated, and secured on the end of the strap, either by means of rivets, or by means of pointed barbs 7 that are struck from the body of the sheet metal and embedded in the body of the strap. It will be perceived that the applied and secured body M overlies and externally reinforces the terminal body portion of the strap, in such manner as to prevent the end of the strap from expanding or fraying. It is important to note that the body M is so shaped and applied that it forms a loop or recess m at the end of the strap, to receive the means E of the chain-applying device. In this case, as in the structure first described, the axis of the loop extends parallel to the end of the strap, and at opposite ends is adapted to receive in articular union the inturned ends of the tongs d. Neither the loops 6 nor the device M interferes with the insertion of the strap 2 in the strap-securing device (3) on the cross-chain structure, nor with the movement of the strap through the opening 5 in the wheel. Indeed, the insertion of the strap is facilitated.

As indicated in the foregoing specification, and within the knowledge of the engineer, various departures from and modifications of the structure described may be made, without avoiding the invention defined in the appended claims.

I claim as my invention:

1. A device for applying to the tire-equipped rims of automobile wheels cross-chains provided with terminal loops, said device including an elongate body of normally circular shape provided at one end with means to engage a cross-chain, said body being of greater breadth than thickness, of greater flexibility in the plane of the circle than on lines transverse thereto, and of resiliency such that, being straightened under tension, it returns to normal shape when the tension is relieved, whereby the device, being advanced around a tire-equipped rim and a cross-chain secured thereto, may be retracted again under straight-line pull, drawing the cross-chain to service position, and, thereafter, being relieved of tension, will resume its normal shape; said strap-engaging means comprising a hook-shaped member extending from the end of said body and being curved in direction transverse to said plane of the circular body for articular engagement with a terminal loop on said cross-chain.

2. A device for applying to the tire-equipped rims of automobile wheels cross-chains provided with terminal loops, said device including an elongate body of normally circular shape provided at one end with means to engage a cross-chain, said body being flexible in the plane of the circle and of resiliency such that, being straightened under tension, it returns to normal shape when the tension is relieved, whereby the device, being advanced around a tire-equipped rim and a cross-chain secured thereto, may be retracted under straight-line pull, drawing the cross-chain to service position, and, thereafter, being relieved of tension, will resume its normal shape; said chain-engaging means comprising a pair of hook-shaped tongs extending from the end of said body and being movable, one hook-shaped element relatively to the other, in direction transverse to said plane of the circular body for articular engagement with a terminal loop on said cross-chain.

JOSEPH A. MARTZ.